US007646157B2

(12) United States Patent
Cruise et al.

(10) Patent No.: US 7,646,157 B2
(45) Date of Patent: Jan. 12, 2010

(54) DRIVING TOOL AND METHOD FOR CONTROLLING SAME

(75) Inventors: Nathan Cruise, Parkville, MD (US); Paul G. Gross, White Marsh, MD (US); Jeffrey A. Elligson, Jarrettsville, MD (US); James J. Kenney, Baltimore, MD (US)

(73) Assignee: Black & Decker Inc., Newark, DE (US)

( * ) Notice: Subject to any disclaimer, the term of this patent is extended or adjusted under 35 U.S.C. 154(b) by 341 days.

(21) Appl. No.: 11/687,224

(22) Filed: Mar. 16, 2007

(65) Prior Publication Data

US 2008/0223894 A1 Sep. 18, 2008

(51) Int. Cl.
*H02K 7/02* (2006.01)

(52) U.S. Cl. .......................... 318/161; 318/150; 227/2; 227/129; 227/131

(58) Field of Classification Search .................... 227/2, 227/38, 129, 131; 318/161, 807, 150, 173
See application file for complete search history.

(56) References Cited

U.S. PATENT DOCUMENTS

| | | | | |
|---|---|---|---|---|
| 1,487,098 A | | 3/1924 | Goldsmith | |
| 2,525,588 A | | 10/1950 | Cameron et al. | |
| 2,795,663 A | | 6/1957 | Estes | |
| 2,832,857 A | | 4/1958 | Landmeier | |
| 3,252,641 A | | 5/1966 | Ciechanowski | |
| 3,700,987 A | | 10/1972 | Deering | |
| 4,042,036 A | | 8/1977 | Smith et al. | |
| 4,129,240 A | | 12/1978 | Geist | |
| 4,171,572 A | | 10/1979 | Nash | |
| 4,204,622 A | | 5/1980 | Smith et al. | |
| 4,267,914 A | * | 5/1981 | Saar | 192/147 |
| 4,292,574 A | | 9/1981 | Sipin et al. | |
| 4,298,072 A | | 11/1981 | Baker et al. | |
| 4,544,090 A | | 10/1985 | Warman et al. | |
| 4,547,226 A | | 10/1985 | Milch et al. | |

(Continued)

FOREIGN PATENT DOCUMENTS

DE 82 32 406.9 4/1983

(Continued)

*Primary Examiner*—Bentsu Ro
*Assistant Examiner*—Antony M Paul
(74) *Attorney, Agent, or Firm*—Harness, Dickey & Pierce, P.L.C.

(57) ABSTRACT

A method for controlling a driving tool having a power source, a driver, an actuator, a follower, and a control unit. The power source includes a motor and a flywheel that is driven by the motor. The actuator is configured to selectively move the follower to push the driver into frictional engagement with a surface of the flywheel. The control unit is configured to selectively activate the electric motor and the actuator. The control unit includes a speed sensor that is configured to sense a rotational speed of an element of the power source and produce a speed signal in response thereto. The method includes: directly determining a rotational speed of an element in the power source; controlling electrical power provided to the motor based on the rotational speed of the element in the power source to cause the flywheel to rotate at a predetermined speed; and actuating the actuator when a set of actuating criteria has been met, the set of actuating criteria not including a rotational speed of the element.

20 Claims, 4 Drawing Sheets

U.S. PATENT DOCUMENTS

| | | | | | |
|---|---|---|---|---|---|
| 4,572,053 | A | | 2/1986 | Sosnowski et al. | |
| 4,612,463 | A | | 9/1986 | Kikuchi | |
| 4,622,500 | A | | 11/1986 | Budelman, Jr. | |
| 4,679,719 | A | | 7/1987 | Kramer | |
| 4,715,522 | A | | 12/1987 | Jordan | |
| 4,724,992 | A | | 2/1988 | Ohmori | |
| 4,763,347 | A | | 8/1988 | Erdman | |
| 4,838,278 | A | | 6/1989 | Wang et al. | |
| 4,928,868 | A | | 5/1990 | Kerrigan | |
| 4,964,558 | A | * | 10/1990 | Crutcher et al. | 227/8 |
| 4,978,045 | A | | 12/1990 | Murakami et al. | |
| 5,018,057 | A | | 5/1991 | Biggs et al. | |
| 5,035,354 | A | | 7/1991 | Meyer | |
| 5,038,481 | A | | 8/1991 | Smith | |
| 5,169,225 | A | | 12/1992 | Palm | |
| 5,189,349 | A | | 2/1993 | Haga | |
| 5,219,578 | A | | 6/1993 | Ansley | |
| 5,320,270 | A | * | 6/1994 | Crutcher | 227/131 |
| 5,412,546 | A | | 5/1995 | Huang | |
| 5,427,002 | A | | 6/1995 | Edman | |
| 5,443,196 | A | | 8/1995 | Burlington | |
| 5,495,161 | A | * | 2/1996 | Hunter | 318/807 |
| 5,507,425 | A | | 4/1996 | Ziglioli | |
| 5,511,715 | A | * | 4/1996 | Crutcher et al. | 227/131 |
| 5,541,510 | A | * | 7/1996 | Danielson | 324/233 |
| 5,545,989 | A | | 8/1996 | Tian et al. | |
| 5,551,621 | A | | 9/1996 | Vallee | |
| 5,605,268 | A | | 2/1997 | Hayashi et al. | |
| 5,723,832 | A | | 3/1998 | Hall | |
| 5,732,870 | A | | 3/1998 | Moorman et al. | |
| 5,772,096 | A | | 6/1998 | Osuka et al. | |
| 5,794,831 | A | | 8/1998 | Velan et al. | |
| 5,918,788 | A | | 7/1999 | Moorman et al. | |
| 5,923,145 | A | | 7/1999 | Reichard et al. | |
| 5,941,441 | A | | 8/1999 | Ilagan | |
| 5,954,458 | A | | 9/1999 | Lee | |
| 5,984,020 | A | * | 11/1999 | Meyer et al. | 173/2 |
| 6,123,241 | A | | 9/2000 | Walter et al. | |
| 6,168,287 | B1 | | 1/2001 | Liu | |
| 6,206,538 | B1 | | 3/2001 | Lemoine | |
| 6,213,372 | B1 | | 4/2001 | Chen | |
| 6,296,065 | B1 | | 10/2001 | Carrier | |
| 6,318,874 | B1 | | 11/2001 | Matsunaga | |
| 6,371,348 | B1 | | 4/2002 | Canlas et al. | |
| 6,382,492 | B1 | | 5/2002 | Moorman et al. | |
| 6,423,241 | B1 | | 7/2002 | Yoon et al. | |
| 6,431,425 | B1 | | 8/2002 | Moorman et al. | |
| 6,465,750 | B1 | | 10/2002 | Rubenstein | |
| 6,511,200 | B2 | | 1/2003 | Matsunaga | |
| 6,604,666 | B1 | * | 8/2003 | Pedicini et al. | 227/131 |
| 6,607,111 | B2 | * | 8/2003 | Garvis et al. | 227/131 |
| 6,669,072 | B2 | | 12/2003 | Burke et al. | |
| 6,705,503 | B1 | | 3/2004 | Pedicini et al. | |
| 6,755,336 | B2 | * | 6/2004 | Harper et al. | 227/129 |
| 6,796,475 | B2 | * | 9/2004 | Adams | 227/2 |
| 6,971,567 | B1 | * | 12/2005 | Cannaliato et al. | 227/2 |
| 6,974,061 | B2 | * | 12/2005 | Adams et al. | 227/2 |
| 7,137,541 | B2 | * | 11/2006 | Baskar et al. | 227/120 |
| 7,165,305 | B2 | * | 1/2007 | Kenney et al. | 29/434 |
| 7,201,303 | B2 | | 4/2007 | Leimbach | |
| 7,267,181 | B2 | * | 9/2007 | Banks | 172/21 |
| 7,325,711 | B2 | * | 2/2008 | Schiestl et al. | 227/131 |
| 7,494,037 | B2 | * | 2/2009 | Simonelli et al. | 227/132 |
| 7,503,401 | B2 | * | 3/2009 | Gross et al. | 173/131 |
| 2002/0108474 | A1 | | 8/2002 | Adams | |
| 2002/0185514 | A1 | | 12/2002 | Adams et al. | |
| 2004/0232194 | A1 | | 11/2004 | Pedicini et al. | |
| 2005/0220445 | A1 | | 10/2005 | Baskar et al. | |

FOREIGN PATENT DOCUMENTS

| | | | |
|---|---|---|---|
| DE | 32 40 857 | A1 | 5/1984 |
| DE | 31 25 494 | C2 | 12/1987 |
| DE | 44 05 661 | C2 | 1/1998 |
| DE | 297 19 020 | U1 | 1/1998 |
| DE | 298 07 070 | U1 | 7/1998 |
| DE | 44 05 648 | C2 | 8/1998 |
| DE | 197 56 360 | A1 | 9/1998 |
| DE | 198 03 936 | A1 | 8/1999 |
| EP | 0 298 594 | A2 | 1/1989 |
| EP | 0 313 187 | A1 | 4/1989 |
| EP | 0 546 834 | A | 6/1993 |
| EP | 0 680 808 | A1 | 4/1995 |
| EP | 0 662 750 | A | 7/1995 |
| EP | 0 829 329 | | 3/1998 |
| EP | 1 068 934 | A1 | 5/2000 |
| EP | 1 223 009 | A2 | 1/2002 |
| EP | 1 231 028 | A2 | 8/2002 |
| GB | 90 10 716.0 | | 10/1990 |
| JP | 3-128625 | | 5/1991 |
| JP | 50-77969 | | 3/1993 |
| JP | 6-246645 | | 9/1994 |
| JP | 10006303 | A | 1/1998 |
| JP | 10-34564 | | 2/1998 |
| JP | 1044064 | | 2/1998 |
| JP | 10034565 | | 2/1998 |
| JP | 10034566 | | 2/1998 |
| JP | 10044064 | | 2/1998 |
| JP | 11111002 | A | 4/1999 |
| WO | WO 93/03878 | | 3/1993 |
| WO | WO 96/12591 | | 5/1996 |
| WO | WO 99/02310 | | 1/1999 |
| WO | WO 02/16085 | | 2/2002 |
| WO | WO 02/051591 | A1 | 7/2002 |
| WO | WO 02/051592 | A1 | 7/2002 |

* cited by examiner

DRIVING TOOL AND METHOD FOR CONTROLLING SAME

INTRODUCTION

The present invention generally relates to driving tools and more particularly to a method for controlling a driving tool that transmits kinetic energy from a rotating flywheel to a driver to propel the driver.

U.S. Patent Application Publication No. 2005/0218174 entitled "Activation Arm Configuration For A Power Tool" discloses a driving tool that transmits kinetic energy from a rotating flywheel to a driver to propel the driver. One method for controlling the driving tool disclosed in the '174 patent application publication employs the back emf of an electric motor that is employed to drive the flywheel. In this regard, electrical power to the electric motor is turned off and rotational inertia backdrives the electric motor such that the electric motor functions as a generator. Characteristics of the power that is generated by the electric motor as it is being back-driven can be employed to approximate the speed of the flywheel. While such configuration is advantageous in that it permits the speed of the flywheel to be approximated without use of relatively expensive speed sensors, there are times in which a greater degree of control over the speed of the flywheel would be desirable.

U.S. Patent Application Publication No. 2002/0108474 entitled "Speed Controller for a Flywheel Operated Hand Tool" discloses a method for controlling the electric motor of a nailer in which electrical power is initially input to the electric motor via a soft-start function to initiate rotation of the electric motor and the flywheel. The full electric power of the battery is applied to the electric motor following the soft-start portion of the cycle and the fastening tool is actuated to initiate movement of a driver when the speed of the flywheel has reached a predetermined speed. Construction of a flywheel-based nailer in this manner can be disadvantageous where it is desired to install several fasteners in quick succession due to time lags associated with the soft-start portion of the cycle, etc.

SUMMARY

In one form, the present teachings provide a method for controlling a driving tool having a power source, a driver, an actuator, a follower, and a control unit. The power source includes a motor and a flywheel that is driven by the motor. The actuator is configured to selectively move the follower to push the driver into frictional engagement with a surface of the flywheel. The control unit is configured to selectively activate the electric motor and the actuator. The control unit includes a speed sensor that is configured to sense a rotational speed of an element of the power source and produce a speed signal in response thereto. The method includes: directly determining a rotational speed of an element in the power source; controlling electrical power provided to the motor based on the rotational speed of the element in the power source to cause the flywheel to rotate at a predetermined speed; and actuating the actuator when a set of actuating criteria has been met, the set of actuating criteria not including a rotational speed of the element.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION OF THE VARIOUS EMBODIMENTS

Figure 1:
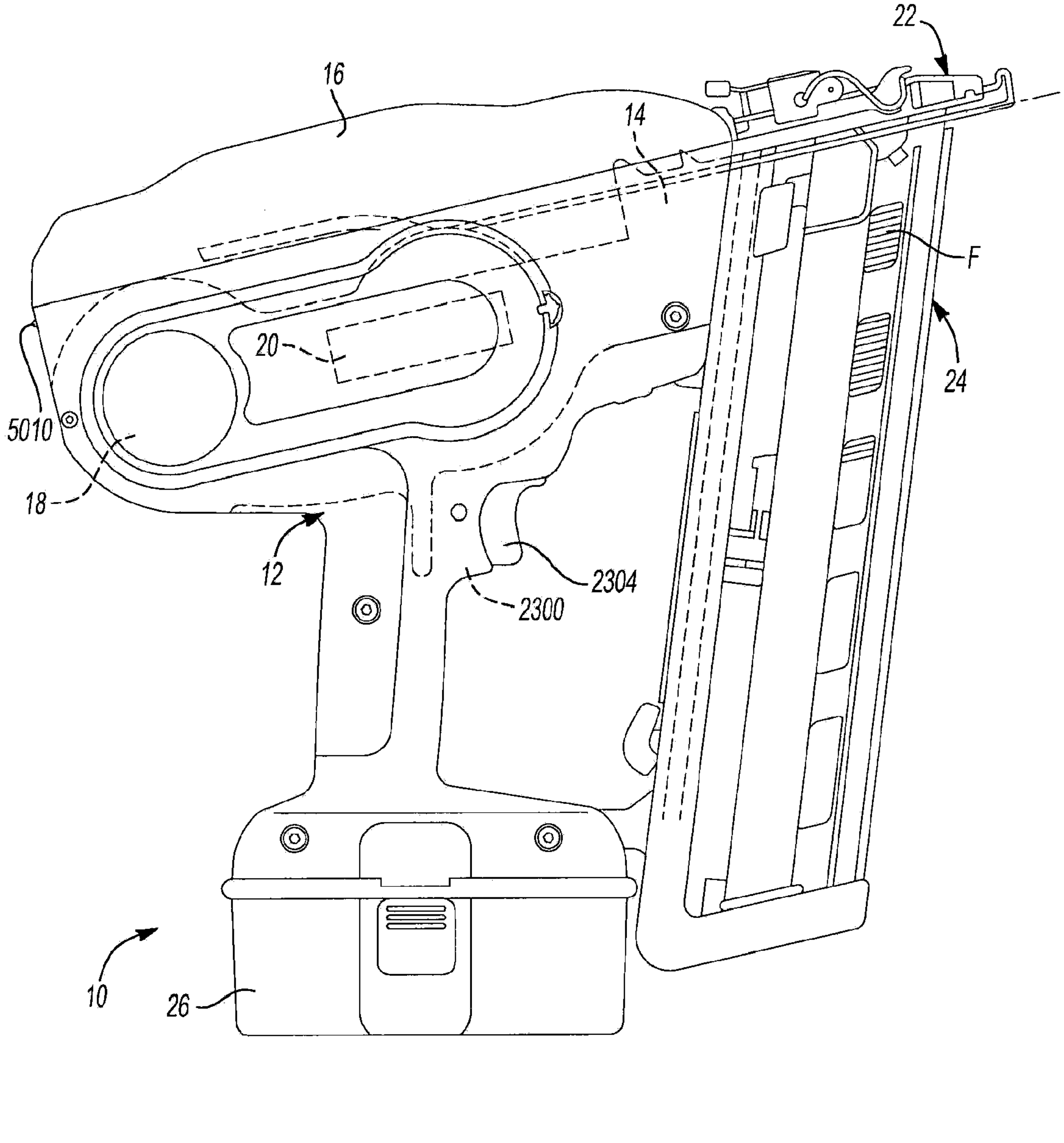
FIG. 1 is a right side elevation view of a driving tool constructed in accordance with the teachings of the present invention.

With reference to FIG. 1, a driving tool constructed in accordance with the teachings of the present disclosure is generally indicated by reference numeral 10. Although the driving tool 10 that is illustrated and described herein is a nailer, those of ordinary skill in the art will appreciate that the present disclosure, in its broadest aspects, has application to other types of driving tools. The driving tool 10 can include a housing assembly 12, a backbone 14, a backbone cover 16, a drive motor assembly 18, a control unit 20, a nosepiece assembly 22, a magazine assembly 24 and a battery pack 26. Except as otherwise described herein, the housing assembly 12, the backbone 14, the backbone cover 16, the drive motor assembly 18, the control unit 20, the nosepiece assembly 22, the magazine assembly 24 and the battery pack 26 can be constructed in a manner which is described in U.S. patent application Ser. No. 11/095,723 entitled "Method For Controlling A Power Driver" and U.S. patent Application Ser. No. 11/095,696 entitled "Activation Arm Configuration For A Power Tool", the disclosures of which are hereby incorporated by reference as if fully set forth in detail herein.

Figure 2:
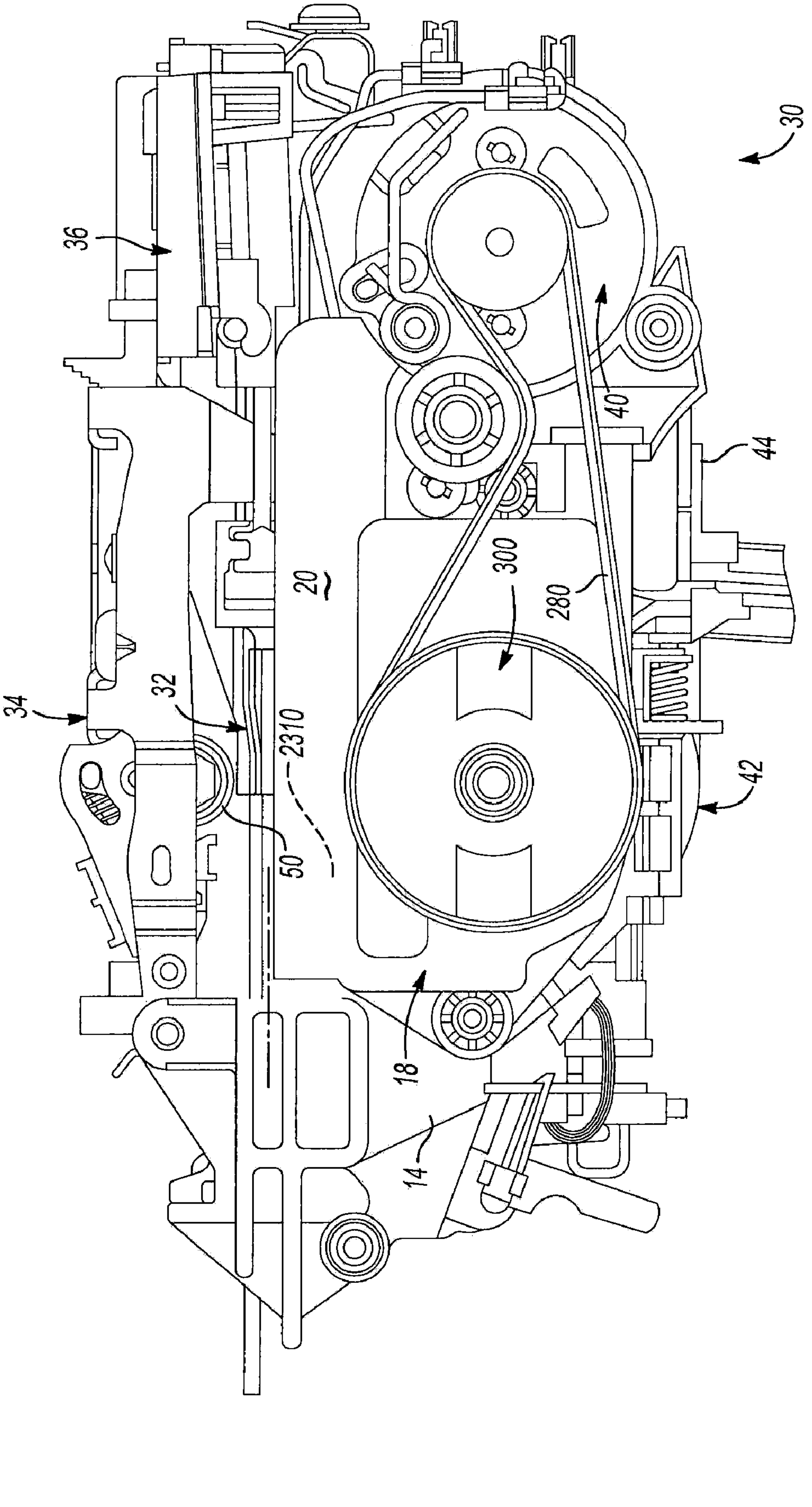
FIG. 2 is a left side view of a portion of the driving tool of FIG. 1 illustrating the backbone, the drive motor assembly and the control unit in greater detail.
Figure 3:
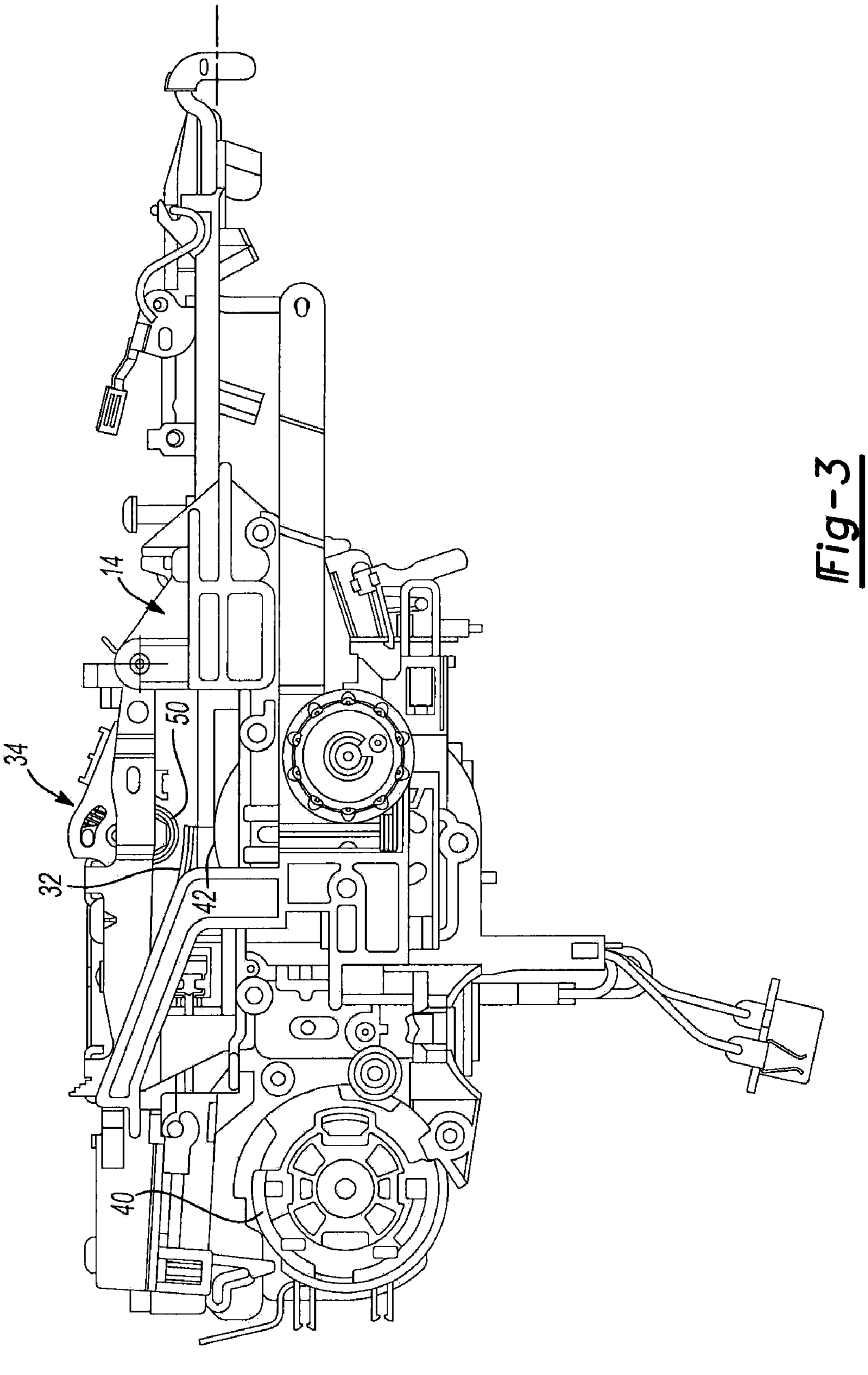
FIG. 3 is a right side view of a portion of the driving tool of FIG. 1 illustrating the backbone, depth adjustment mechanism and contact trip mechanism in greater detail.

With reference to FIGS. 2 and 3, the drive motor assembly 18 can include a power source 30, a driver 32, a follower assembly 34 and a return mechanism 36. The power source 30 can include a motor 40, a flywheel 42, and an actuator 44.

Figure 4:
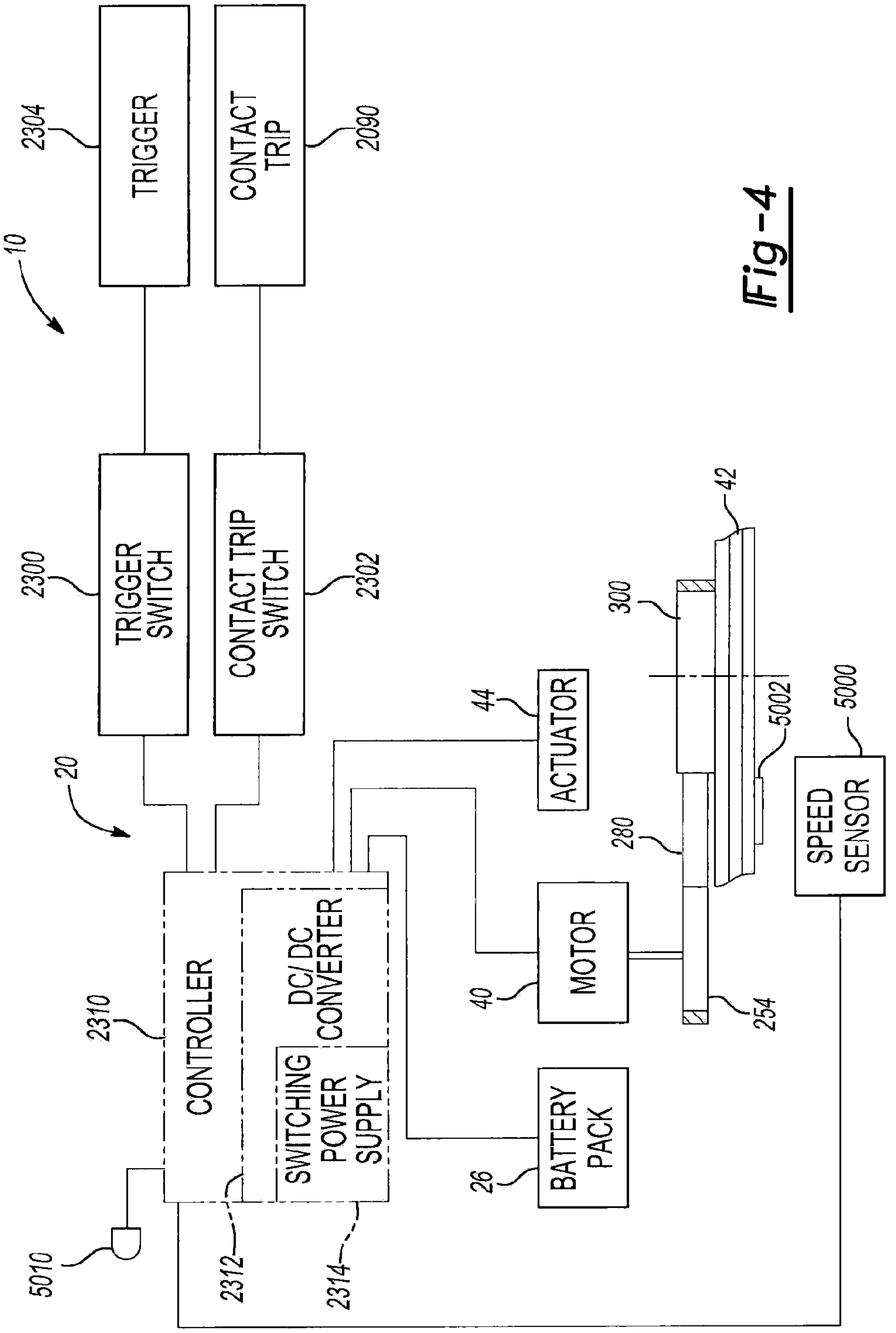
FIG. 4 is a schematic illustration of a portion of the driving tool of FIG. 1, illustrating the control unit in greater detail.

With reference to FIG. 4, the control unit 20 may include a trigger switch 2300, a contact trip switch 2302, and a controller 2310 that can have a DC-DC converter 2312 with a switching power supply 2314 for pulse-modulating the electrical power that is provided by the battery pack 26 to power the electric motor 40. The trigger switch 2300 can be configured to output a trigger signal to the controller 2310 in response to actuation of a trigger 2304 (FIG. 1). The contact trip switch 2302 can be configured to output a contact trip signal to the controller 2310 in response to actuation of a contact trip mechanism 2090 (FIG. 1) that is associated with the nosepiece assembly 22 (FIG. 1). The switching power supply 2314 switches (i.e., turns on and off) to control its output to the motor 40 to thereby apply power of a desired voltage to the motor 40. Consequently, electrical power of a substantially constant overall voltage may be provided to the motor 40 regardless of the voltage of the battery pack 26 by adjusting the duty cycle or length of time at which the switching power supply 2314 has been turned off and/or on.

The control unit 20 can also include a speed sensor 5000 that is configured to sense a speed of an element associated with power source 30 (FIG. 1) and responsively output a speed signal to the controller 2310 in response thereto. In the particular example provided, the speed sensor 5000 is a non-contact type speed sensor, such as a Hall-effect sensor that is coupled to the backbone 14 (FIG. 1) and configured to sense a magnetic field associated with a magnet 5002 that is coupled for rotation with an element in the power source 30 (FIG. 1), such as the flywheel 42, which is driven by the electric motor 40 via a motor pulley 254 (driven by the electric motor 40), a flywheel pulley 300 (rotatably coupled to the flywheel 42) and a belt 280 that transmits power between the motor pulley 254 and the flywheel pulley 300. It will be appreciated, however, that any type of non-contact speed sensor, such as an Eddy-current sensor, or a contact-type speed sensor could be employed.

Returning to FIGS. 1 through 3, fasteners F are stored in the magazine assembly 24, which sequentially feeds the fasteners F into the nosepiece assembly 22. The drive motor assembly 18 may be actuated by the control unit 20 to cause the driver 32 to translate and impact a fastener F in the nosepiece assembly 22 so that the fastener F may be driven into a workpiece (not shown). Actuation of the power source may utilize electrical energy from the battery pack 26 to operate the motor 40 and the actuator 44. The motor 40 is employed to drive the flywheel 42, while the actuator 44 is employed to move a follower 50 that is associated with the follower assembly 34, which squeezes the driver 32 into engagement with the flywheel 42 so that energy may be transferred from the flywheel 42 to the driver 32 to cause the driver 32 to translate. The nosepiece assembly 22 guides the fastener F as it is being driven into the workpiece. The return mechanism 36 biases the driver 32 into a returned position.

In the example provided, the control unit 20 employs the speed signal in a feedback control loop when controlling the power that is output to the motor 40. In this regard, the control unit 20 can alter the duty-cycle of the electrical energy that is provided to the motor 40 to cause the flywheel 42 to rotate at the desired speed regardless of the state of charge of the battery pack 26.

Moreover, the control unit 20 can control the motor 40 to maintain the speed of the flywheel 42 at the desired speed if a predetermined input signal is maintained. For example, the control unit 20 can control the motor 40 to maintain the flywheel 42 at the desired speed while the trigger signal or the contact trip signal is being generated.

It will be appreciated that the control unit 20 can cause the actuation of the actuator 44, which can be a solenoid with a linear output, to cause a follower 50 associated with the follower assembly 34 to drive the driver 32 into engagement with a (rotating) surface of the flywheel 42 to thereby transmit kinetic energy from the flywheel 42 to the driver 32 and propel the driver 32. The control unit 20 can cause the actuation of the actuator 44 when a set of actuating criteria has been met. It will be appreciated that the actuating criteria need not include the rotation of an element in the power source 30 (such as the flywheel 42 or the magnet 5002) at a predetermined rotational speed. Rather, the set of actuating criteria can include receipt of the trigger signal by the controller 2310, receipt of contact trip signal by the controller 2310 and the elapse of a predetermined amount of time after one or both of the of the trigger signal and the contact trip signal are received by the controller 2310. In situations where there is insufficient electrical power in the battery pack 26 to cause the motor 40 to drive the flywheel 42 at the predetermined rotational speed, a set of lights 5010 may be illuminated by the controller 2310 to signal to the user that the battery pack 26 should be recharged. Nonetheless, the controller 2310 is not configured to inhibit operation of the actuator 44 in response to a determination that the battery pack 26 has insufficient electrical power to cause the flywheel 42 to be driven at the predetermined rotational speed. Accordingly, fasteners F installed when the battery pack 26 is insufficiently charged may not be seated as deeply into a workpiece.

While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, the mixing and matching of features, elements and/or functions between various examples is expressly contemplated herein so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims.

What is claimed is:

1. A method for controlling a driving tool having a power source, a driver, an actuator, a follower, and a control unit, the power source including a motor and a flywheel that is driven by the motor, the actuator operable for selectively moving the follower to push the driver into frictional engagement with a surface of the flywheel, the control unit operable for selectively activating the electric motor and the actuator, the control unit including a speed sensor that is configured to sense a rotational speed of an element of the power source and produce a speed signal in response thereto, the method comprising:

directly determining a rotational speed of an element in the power source;

controlling electrical power provided to the motor based on the rotational speed of the element in the power source to cause the flywheel to rotate at a predetermined speed; and actuating the actuator to move the follower when a set of actuating criteria has been met, the follower pushing the driver into contact with the surface of the flywheel as the flywheel is rotating.

2. The method of claim 1, wherein the speed sensor is a non-contact type sensor.

3. The method of claim 2, wherein the non-contact type sensor is a Hall-effect sensor.

4. The method of claim 3, wherein the element is a magnet.

5. The method of claim 4, wherein the magnet is coupled for rotation with the flywheel.

6. The method of claim 2, wherein the non-contact type sensor is an Eddy current sensor.

7. The method of claim 1, wherein the control unit further comprises a trigger switch and a contact trip switch, the trigger switch providing a trigger signal in response to actuation of a trigger, the contact trip switch providing a contact trip signal in response to actuation of a contact trip mechanism, and wherein the control unit causes electrical power to be transmitted to the motor when the trigger signal is generated, when the contact trip signal is generated and when both the trigger signal and the contact trip signal are generated.

8. The method of claim 1, further comprising electrically coupling a battery pack to the driving tool, the battery pack providing electrical power for the power source, the actuator and the controller.

9. The method of claim 8, further comprising determining whether the battery pack has insufficient electrical power to cause the motor to drive the flywheel at the predetermined rotational speed.

10. The method of claim 9, further comprising generating a recharge signal to indicate that the battery pack should be recharged.

11. The method of claim 10, wherein the recharge signal is a visual signal that is communicated to a user of the driving tool.

12. The method of claim 11, wherein the visual signal is generated by an illuminated light.

13. The method of claim 10, wherein the recharge signal is generated prior to actuating the actuator.

14. A driving tool comprising:

a power source including a motor and a flywheel that is driven by the motor;

a driver;

a follower;

an actuator operable for selectively moving the follower to push the driver into frictional engagement with a surface of the flywheel; and a control unit operable for selectively activating the electric motor and the actuator, the control unit including a speed sensor that is configured to sense a rotational speed of an element of the power source and produce a speed signal in response thereto wherein the control unit directly determines a rotational speed of an element in the power source and controls electrical power provided to the motor based on the rotational speed of the element in the power source to cause the flywheel to rotate at a predetermined speed; and wherein the control unit actuates the actuator when a set of actuating criteria has been met.

15. The driving tool of claim 14, wherein the speed sensor is a non-contact type sensor.

16. The driving tool of claim 15, wherein the non-contact type sensor is a Hall-effect sensor.

17. The driving tool of claim 16, wherein the element is a magnet.

18. The driving tool of claim 17, wherein the magnet is coupled for rotation with the flywheel.

19. The driving tool of claim 14, wherein the control unit further comprises a trigger switch and a contact trip switch, the trigger switch providing a trigger signal in response to actuation of a trigger, the contact trip switch providing a contact trip signal in response to actuation of a contact trip mechanism, and wherein the control unit causes electrical power to be transmitted to the motor when the trigger signal is generated, when the contact trip signal is generated and when both the trigger signal and the contact trip signal are generated.

20. The driving tool of claim 14, further comprising a battery pack that is electrically coupled to the power source, the actuator and the controller for providing electrical power thereto.

* * * * *